June 14, 1960     A. R. ASKUE     2,940,191
EXCAVATOR ROOTER TOOTH ASSEMBLY
Filed July 5, 1957

*INVENTOR.*
ALBERT R. ASKUE
BY
Bates, Teare + McBean
ATTORNEYS

United States Patent Office 2,940,191
Patented June 14, 1960

2,940,191

EXCAVATOR ROOTER TOOTH ASSEMBLY

Albert R. Askue, Euclid, Ohio, assignor to The Cleveland Trencher Company, Cleveland, Ohio, a corporation of Ohio Filed July 5, 1957, Ser. No. 670,064

2 Claims. (Cl. 37—142)

This invention relates generally to rooter teeth for use with digging buckets or rotary excavator mechanisms on trenching machines and the like and more particularly relates to an improved construction for a shank and removable tip for a rooter tooth to facilitate their assembly and use.

The rooter teeth of excavating machines are subjected to severe usage in operation. Accordingly, it has become common practice to construct the rooter teeth in the form of a separable assembly having a shank fixed on the excavating equipment and a removable tip which can be refurbished and returned to use. Various arrangements have been utilized for removably mounting the tips on the shanks to complete the assembly, including bolts, keys and the like. However, the severe impact and shock to which the teeth are subjected during ordinary usage soon distorts the bolts and surfaces forming the keys to such an extent as to prevent or otherwise render difficult the removal of the tips for repair or replacement.

An improved form of mounting the tip on the shank is shown in Patent No. 2,752,702 issued to my assignee, the Cleveland Trencher Company, July 3, 1956. This patent discloses a shank and a removable tip having a socket adapted to seat on the shank in intimate engagement therewith and includes a raised protuberance on the mating end of the shank which coacts with the tip socket to provide a more secure connection between the tip and the shank in the manner described therein. The raised protuberance on the shank increases the holding power of the tip by deforming the upper wall of the tip socket when the tip is hammered onto the shank. However, I have found that this is not entirely satisfactory because it does not positively insure the same increased holding power after the tip is removed and reapplied to the shank several times during use.

Accordingly, it is a principal object of this invention to provide an improved construction for a removable rooter tip on which an abutment may be readily formed for interlocking coaction with a supporting shank to prevent inadvertent withdrawal during use.

Briefly, in accordance with this invention, the foregoing general objective is preferably obtained by providing a protuberance on at least one engaging face of the rooter tooth shank and forming a relatively thin portion in the mating socket wall of the removable rooter tip which, when positioned in overlying relation to the protuberance on the shank during assembly, can be readily deformed or sheared to provide an abutment coacting in interlocking relation with the raised protuberance on the shank and thereby prevent inadvertent separation of the tip from the shank during ordinary usage.

Figure 1:
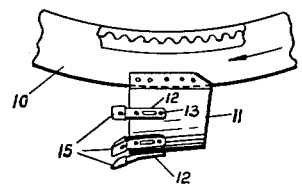
Figure 1 is a fragmentary view of a portion of an excavating wheel illustrating an excavating bucket provided with the improved rooter teeth.

Referring now to the drawings and more particularly to Figure 1 thereof, there is shown a portion of an excavating wheel 10 provided with an excavating bucket 11 which is merely a fragmentary portion of an excavating machine of the type shown in greater detail in Patent No. 2,280,004 issued April 14, 1942, to my assignee, the Cleveland Trencher Company. Suitable mechanism, not shown, rotates the excavating wheel 10 in the direction of the arrow in Figure 1 so that the forward edge of the excavating bucket 11 will engage the material to be excavated.

Figure 2:
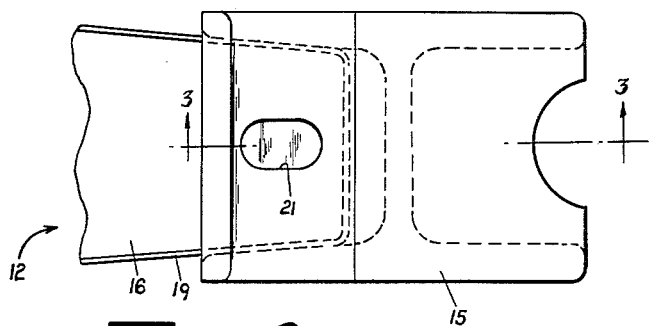
Figure 2 is an enlarged fragmentary plan view of the rooter tooth assembly including the supporting portion of the shank and the removable tip.
Figure 3:
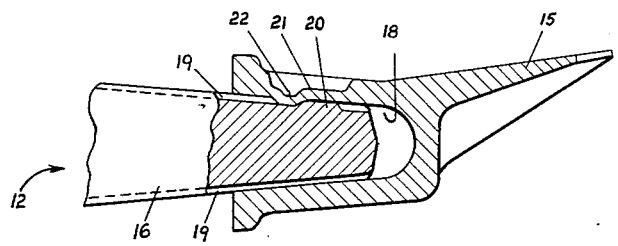
Figure 3 is a sectional view taken along lines 3—3 in Figure 2.

The improved rooter teeth assemblies are each shown as including a base 12 which is mounted on the bucket 11 by bolts or other suitable means 13. The assemblies also include removable tips 15 which are shown assembled in place on the corresponding bases 12 in Figure 1. Each tooth base 12 has a forwardly extending shank portion 16 which enters and engages a recessed socket 18 formed in the rear or noncutting extremity of the corresponding rooter tip 15. The socket recess 18 and the shank 16 are substantially rectangular in transverse section except for selected undercut portions 19 which are so arranged and constructed that the position of the tip on the supporting shank is maintained by the frictional engagement between the walls of the shank and the tip socket. As best seen in Figures 2 and 3, the walls of the shank and socket portions are tapered in such manner as to coact in self-engaging frictional engagement in the manner hereinbefore described. A more complete description of the details of the shank and removable tip and the manner in which their tapered surfaces cooperate, one with the other during and in assembly, may be found in Patent No. 2,752,702 heretofore noted.

As hereinbefore noted, this invention is more particularly directed to an improved rooter tooth construction having between the shank and tip an increased holding power which can be effectively maintained even after the tip is removed and reapplied to the shank several times. This construction is best shown in Figures 2 and 3 of the drawings as including a raised protuberance 20 on the upper face, when viewed in Figure 3, of the shank 16 and a relatively thinner wall portion 21 on the mating socket wall of the tip 15. The thinner wall portion 21 can be readily deformed by staking or the like after the tip 15 is assembled onto the shank 16 as best shown in Figure 3 and it may be initially formed by casting or forging during production of the removable tip. This staking operation may be eliminated in cases where the thinner wall portion 21 conforms to the raised protuberance 20 during assembly and use. It will be readily apparent that the deformation of the relatively thinner mating wall portion 21 of the tip socket 18 forms an abutment 22 which interlocks with or engages the raised protuberance 20 on the shank 16 and positively prevents inadvertent withdrawal of the removable tip 15 from the shank during ordinary usage. Yet, by striking a sufficiently hard blow in the opposite direction; that is, at the rear or socket portion of the removable tip 15, the tip can be readily separated from the shank 16 for repair or replacement. The interlocking coaction between the abutment 22 and protuberance 20 will continue to be effective on reassembly and may be reinforced by subsequent deformation after repeated use.

Figure 4:
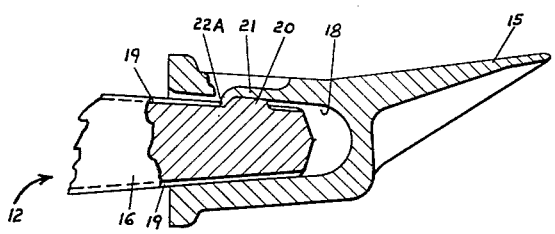
Figure 4 is a sectional view similar to that of Figure 3 but illustrating a modified form of the resultant tooth assembly.

The arrangement shown in Figure 4 of the drawings illustrates a modified form of the resultant tooth assembly wherein the relatively thinner wall portion 21 of the tip socket 18 is actually sheared to provide a depending abutment 22A which also prevents inadvertent withdrawal of the tip from the shank 16 during ordinary usage. The same advantage is available regardless of whether the socket wall is merely deformed as in Fig. 3, or sheared, as in Fig. 4, and as a result there is provided an improved shank and tip assembly for a rooter tooth having a more positive engagement for holding the removable tip on the shank during normal usage as well as being capable of continued effectiveness during successive applications of the tip to the shank.

I have shown and described what I consider to be the preferred embodiments of my invention, and it will be obvious to those skilled in the art that other changes and modifications may be made without departing from the scope of my invention as defined in the appended claims.

I claim:

1. A rooter tooth assembly for excavators comprising, a base member having a forwardly projecting shank, a reusable removable tip member having a socket portion seated in frictional engagement on said shank, a raised protuberance on the upper face of said shank, said socket portion having a wall confronting said upper face of said shank, said wall having a relatively large preformed horizontally closed and upwardly opening depression in a localized section thereof, the bottom wall portion of said depression being of a lesser thickness as compared to the remainder of said wall of said socket portion, said depression being formed forwardly of the rear end of said socket portion and overlying said protuberance with the latter and said bottom wall portion being in engagement, the inwardly facing surface of said bottom wall portion initially being generally co-planar with the remainder of the inwardly facing surface of said wall of said socket portion, said bottom wall portion being sheared transversely thereof and deformed inwardly adjacent the rearward extremity of said protuberance to form a depending transversely extending tongue portion projecting inwardly into interlocking coaction with said protuberance to prevent inadvertent withdrawal of said tip member from said shank, said transversely extending tongue portion being anchored to said bottom wall portion at opposite ends of said tongue portion and generally rearwardly of said protuberance to provide a high stress resistant interlock between said tip member and said shank, said tip member being removable from said shank by application of a generally forwardly directed predetermined force to the rear end of said socket portion whereby said tongue portion is deformed outwardly by said protuberance without fracturing of said tongue portion and said tip member is driven off of said shank.

2. A rooter tooth assembly for excavators comprising, a base member having a forwardly projecting shank, a reusable removable tip member having a socket portion seated in frictional engagement on said shank, a raised protuberance on the upper face of said shank, said socket portion having a wall confronting said upper face of said shank, said wall having a relatively large preformed horizontally closed and upwardly opening depression in a localized section thereof, the bottom wall portion of said depression being of a lesser thickness as compared to the remainder of said wall of said socket portion, said depression being formed forwardly of the rear end of said socket portion and overlying said protuberance with the latter and said bottom wall portion being in engagement, the inwardly facing surface of said bottom wall portion initially being generally co-planar with the remainder of the inwardly facing surface of said wall of said socket portion, said bottom wall portion adjacent the rearward extremity of said protuberance being deformed inwardly transversely of said bottom wall portion and into interlocking coaction with said protuberance to prevent inadvertent withdrawal of said tip member from said shank, said transversely extending deformed portion being anchored to said bottom wall portion completely along the defining boundaries of said deformed portion and generally rearwardly of said protuberance to provide a high stress resistant interlock between said tip member and said shank, said tip member being removable from said shank by application of a generally forwardly directed predetermined force to the rear end of said socket portion whereby said inwardly deformed portion is deformed outwardly by said protuberance without fracturing of said deformed portion and said tip member is driven off of said shank.

References Cited in the file of this patent

UNITED STATES PATENTS

| | | |
|---|---|---|
| 2,124,230 | Hosmer et al. | July 19, 1938 |
| 2,305,653 | Ward | Dec. 22, 1942 |
| 2,433,001 | Mork | Dec. 23, 1947 |
| 2,603,009 | Smith | July 15, 1952 |
| 2,752,702 | Nelson | July 3, 1956 |
| 2,870,552 | Richardson | Jan. 27, 1959 |
| 2,885,801 | Hill | May 12, 1959 |